United States Patent [19]

Tamura et al.

[11] 4,369,542

[45] Jan. 25, 1983

[54] MIRROR APPARATUS HAVING WIPER MEANS

[75] Inventors: Takeo Tamura; Takayoshi Kido, both of Yokohama; Tatsuo Nakamura, Tokyo, all of Japan

[73] Assignees: Nissan Motor Co., Ltd., Yokohama; Ichikoh Industries Limited, Tokyo, both of Japan

[21] Appl. No.: 291,504

[22] Filed: Aug. 10, 1981

[30] Foreign Application Priority Data

Jan. 11, 1980 [JP] Japan ............................. 55-1087[U]
Aug. 14, 1980 [JP] Japan ........................... 55-114448[U]

[51] Int. Cl.³ ............................................. B60S 1/38
[52] U.S. Cl. ............................. 15/250 B; 15/250.36; 15/250.42
[58] Field of Search ............. 15/250 A, 250 B, 250.42, 15/250.36, 250.38

[56] References Cited

U.S. PATENT DOCUMENTS

| | | | |
|---|---|---|---|
| 1,694,245 | 12/1928 | Baker et al. | 15/250.36 |
| 2,913,754 | 11/1959 | Vander Zee | 15/250 B |
| 3,447,187 | 6/1969 | Barrett | 15/250 B |

FOREIGN PATENT DOCUMENTS 2328694 1/1974 Fed. Rep. of Germany ... 15/250 A

*Primary Examiner*—Peter Feldman

[57] ABSTRACT

A mirror apparatus having a wiper means intended to wipe a surface of a mirror supported on a mirror holder, wherein the wiper means comprises: a rubber ribbon for wiping the mirror surface; a pair of holders for supporting the rubber ribbon; and a pair of stays for supporting the pair of holders, respectively, to cause them to exert wiping operations, the rubber ribbon being provided with a curvable intermediate portion and a curvable end portion which are resulted from arrangement of the rubber ribbon being supported by the pair of holders excluding an intermediate portion and at least one end portion of the rubber ribbon, the pair of stays being coupled to each other by a shaft member at a site just above the intermediate portion of the rubber ribbon to provide for pivotable actions of these stays, that particular holder which located on the curvable end portion side of the rubber ribbon being coupled to its mating stay at a site located within a groove formed at a corresponding site of the rubber ribbon, to thereby reduce unwiped regions on the mirror surface and to enhance wiping efficiency.

4 Claims, 8 Drawing Figures

MIRROR APPARATUS HAVING WIPER MEANS

BACKGROUND OF THE INVENTION (a) Field of the invention

The present invention relates to a mirror apparatus provided with a wiper means, and more particularly it pertains to a mirror apparatus having a wiper means supported on a mirror holder to wipe the surface of the mirror.

(b) Description of the prior art

There have been proposed various kinds of mirror apparatuses having a wiper means. Such conventional mirror apparatuses, in general, have the arrangement that a rubber ribbon is provided in the wiper means adapted for wiping the surface of the mirror. However, as shown in FIG. 1, the surface a of a mirror of such apparatus has a relatively small area, and the mirror is surrounded at its peripheral edges by a frame b. Accordingly, during the wiping operation by the wiper means, the end edge of a rubber ribbon c of the wiper means is brought into contact with certain portions of the frame b per se which frame defining the outermost peripheral edges of the mirror apparatus, and is hampered of its further movement therefrom. Thus, such wiper means is unable to perform the wiping of substantially the entire surface of the mirror, leaving non-wiped regions d indicated by hatched lines in FIG. 1. Such problem has occurred especially in case the rubber ribbon is made with a relatively hard material.

At such instance of wiping operation as stated above, the rubber ribbon becomes unable also to wipe the mirror surface always in close contact with the mirror surface. Thus, there will arise such inconvenience as is represented by an increase in blocked portions in the field of vision on the mirror surface by the rubber ribbon, so that there has been the problem that the visibility at the surface of the mirror is poor.

SUMMARY OF THE INVENTION

It is, therefore, a basic object of the present invention to solve the above-discussed problems and inconveniences of the prior art, and to provide a mirror apparatus having a wiper means, which greatly reduces the surface portions of the mirror which are left unwiped during the wiping operation and which thus has a good wiping efficiency.

Another object of the present invention is to provide a mirror apparatus having a wiper means for wiping the mirror surface, comprising: a rubber ribbon for wiping the surface of the mirror, a pair of holders for supporting said rubber ribbon, and a pair of stays for supporting said pair of holders, respectively, for allowing smooth and substantially perfect wiping operation, said pair of holders being arranged to support said rubber ribbon excluding an intermediate portion and also at least one end portion of the rubber ribbon to thereby provide, in the rubber ribbon, an intermediate portion at which the rubber ribbon can curve and also an end portion at which this rubber ribbon can curve also, said pair of stays being pivotably coupled together by a shaft means at a site located just above said intermediate portion of the rubber ribbon to thereby permit the stays to pivot relative to each other, and furthermore said site of coupling by which a specific holder in the pair which is located on the curvable end portion of the rubber ribbon is pivotably connected to its mating stay lies within a groove formed on the rubber ribbon at a portion corresponding thereto.

BRIEF DESCRIPTION OF THE DRAWINGS

FIGS. 2 to 7 are diagrammatic illustrations showing an embodiment of the mirror apparatus having a wiper means according to the present invention, in which:

FIG. 2 is a front view of the mirror apparatus provided with a wiper means of said embodiment.

FIG. 3 is a side view of this mirror apparatus.

FIG. 4 is a side view of the rubber ribbon of said mirror apparatus.

FIG. 5 is a sectional view of said rubber ribbon.

FIG. 6 is a diagrammatic perspective view for explaning the operation of the manner of attachment of the rubber ribbon to the apparatus.

FIG. 7 is a side view of the end portion of the apparatus to explain the operation of attachment of the rubber ribbon.

DETAILED DESCRIPTION OF THE PREFERRED EMBODIMENTS

Description will hereunder be made with respect to a preferred embodiment of the present invention by giving reference to the accompanying drawings.

Figure 1:
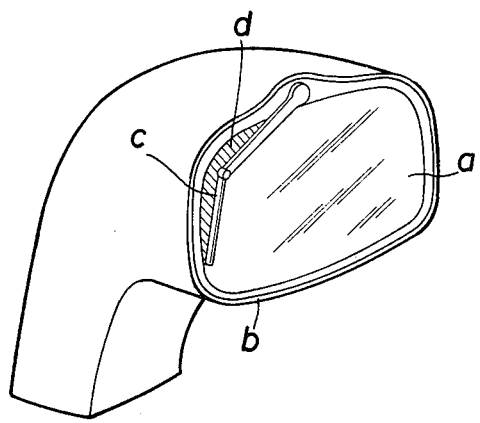
FIG. 1 is a diagrammatic perspective view showing a conventional mirror apparatus.
Figure 2:
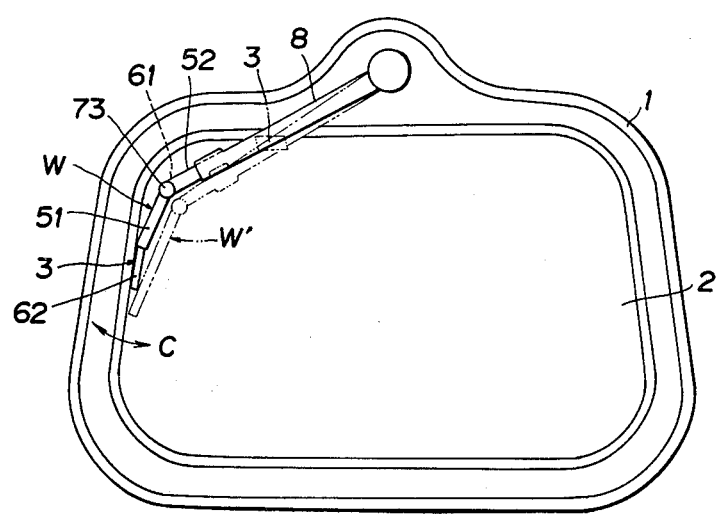
Figure 3:
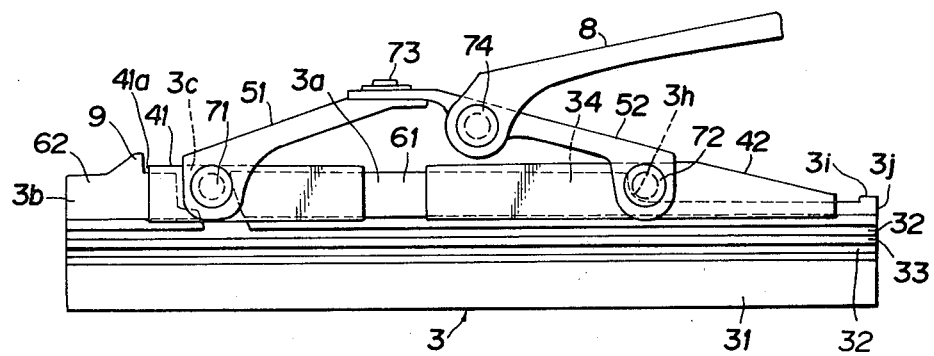

The mirror apparatus according to the present invention is provided, as shown in FIG. 2, with a wiper means W adapted to wipe the surface of a mirror 2 which, in turn, is supported on a mirror holder 1. This wiper means W, as will be noted in FIG. 3 wherein substantially the entire side portions thereof are shown and FIG. 4, comprises a rubber ribbon 3 intended to wipe the surface of the mirror 2, a pair of holders 41 and 42 for supporting said rubber ribbon 3, and a pair of stays 51 and 52 for supporting these holders 41 and 42 to cause them to perform wiping operations.

The holder 41 and 42 are arranged to support the rubber ribbon 3, excluding an intermediate portion 3a and an end portion 3b of the rubber ribbon 3, whereby to provide a curvable intermediate portion 61 and a curvable end portion 62 in the rubber ribbon 3.

Figure 5:
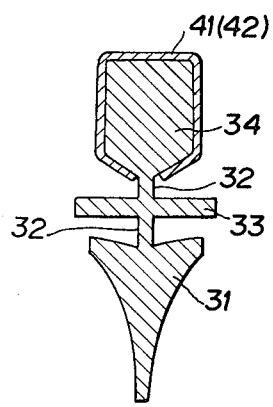
Figure 6:
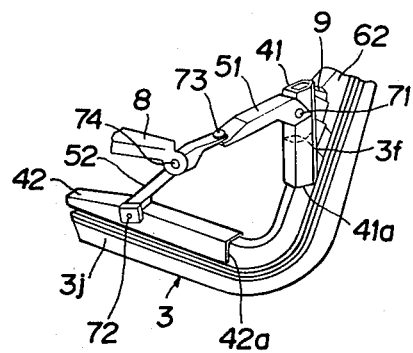

The holders 41 and 42 are coupled to their mating stays 51 and 52 by respective pins 71 and 72. Also, the rubber ribbon 3 has a sectional configuration as illustrated in FIG. 5. This configuration comprises a tapered wiping portion 31, a connecting portion 32 provided with a reinforcing fin portion 33, and an upper portion 34 which is held by the holders 41 and 42.

The stays 51 and 52 are constructed so as to be able to pivot relative to each other at a site located just above the intermediate portion 3a of the rubber ribbon 3. As shown, this arrangement of the stays 51 and 52 is attained by pivotably coupling them to a pin 73 which rotates, about its axis, in a plane parallel with the surface of the mirror 2. Furthermore, the stay 52 is rotatably coupled by a pin 74 to an arm 8. As a result, the stays 51 and 52 are caused to move by reciprocating movements of this arm 8. Accordingly, owing to the movement of these stays 51 and 52, the rubber ribbon 3 is caused to move via the holders 41 and 42.

The holder 41 which is located on the curvable end 62 side of the rubber ribbon 3 is such that its pin 71 by which this holder 41 is coupled to its mating stay 51 is positioned within a groove 3c formed at a corresponding portion in the rubber ribbon 3.

Owing to the fact that the groove 3c is formed as stated above, it is possible to make the vertical dimension or height of the curvable end portion 62 of the rubber ribbon 3 greater than such dimension of the other portions of the rubber ribbon 3. In this embodiment, this dimension which is indicated at H' is given so as to be equal to the height of the intermediate portion 3a and also equal to those portions which are held by the holders 51 and 52. Moreover, the curvable end portion 62 of the rubber ribbon 3 is provided with the formation of a reinforcing projection 9 to enhance the rigidity of the rubber ribbon in its vertical direction as viewed in the drawing. As a result, it will be noted that, in spite of the fact that this end portion 62 is not supported by the holder 51, said vertical rigidity of the rubber ribbon will not decrease, and it is possible to effectively transmit the pressure force given by the holder 51 to the surface of the mirror 2 and thereby to accomplish an unfailing wiping action. Said reinforcing projection 9 is formed at a site of the rubber ribbon 3 located near the end 41a of the holder 41. Whereby, the projection 9 can concurrently serve as a stopper for the holder 41.

Figure 4:
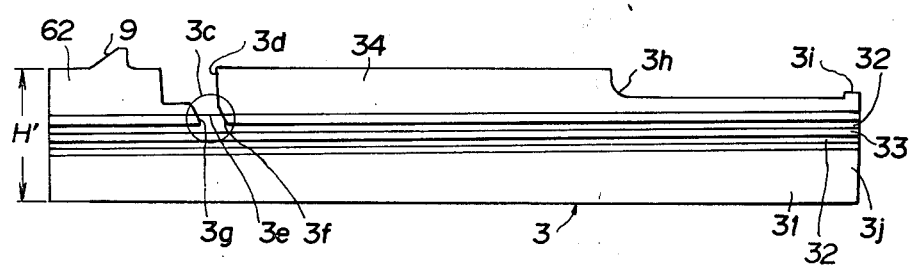

Also, the groove 3c, as shown in FIG. 4, has a inner end face 3d for positioning the pin 71. The lower portion of this groove 3c is so formed as to provide a narrow vertical groove 3e. This vertical groove 3e has an inner wall surface 3f and an outer wall surface 3g, both of which wall surfaces are obliquely inclined, respectively.

On the other hand, that end portion 3j of the rubber ribbon 3 which is located remotely from the curvable end portion 62 thereof has a shoulder portion 3h for the positioning of the pin 72, and the remainder portion of said end portion 3j has a smaller height for the entire length of this remainder portion. This end portion 3j also is provided with a stopper 3i at its extreme end. This stopper 3i serves to anchor the end of the holder 42.

Such rubber ribbon 3 as described above is attached to the holders 41 and 42 in the below-mentioned manner.

Figure 7:
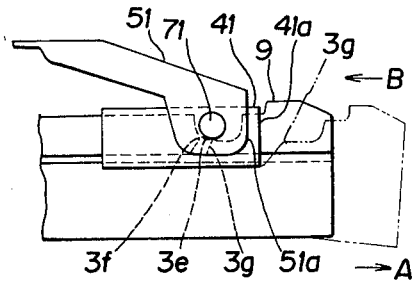

As a first step, the holders 41 and 42 are displaced of their positions about the coupling point (pin 73) of the stays 51 and 52 so that their extensions cross each other at an angle of about 90 degrees. Then, the rubber ribbon 3 which is bent into two folds is inserted at their free ends through inner inlets 41a and 42a of the respective holders 41 and 42, respectively. In such case, that particular end 3j of the rubber ribbon 3 which is located remote from the curvable end 62 is inserted, as it is, through the inlet 42a as illustrated. On the other hand, the insertion of the curvable end portion 62 side is carried out in such way that the insertion starts at the inner wall face 3f of the vertical groove 3e which is located below the groove 3c of said curvable end portion 62. The insertion of these portions of the rubber ribbon 3 is continued until the projection 9 and the stopper 3i which are formed on the rubber ribbon 3, respectively, are brought into contact with the pins 71 and 72, respectively, to be limited of the positions of these portions of the rubber ribbon. As a result, the curvable end portion 62 will be rendered to the state in which it is displaced somewhat from the holder 51, as illustrated. Thereafter, the holders 51 and 52 are rectified of their crossing state into a straightened posture. In such part of the assembling procedure, the projection 9 and the stopper 3i abut the respective pins 71 and 72 to prevent the rubber ribbon 3 from its casual escaping out of the respective holders 51 and 52. Then, the curvable end portion 62 is pulled to the outside direction (in the direction indicated by an arrow A) as shown in FIG. 7 to displace the outer wall face 3g of the vertical groove 3e up to a position at which this outer wall face 3g crosses over the end face 51a of the holder 51. The resulting state is shown by imaginary lines in FIG. 7. Then, the curvable end portion 62 is inserted into the holder 41 in a direction opposite to the direction of said pulling, i.e. in the direction indicated by an arrow B, in such manner that the projection 9 which functions as a stopper will be brought into contact with the end face of the holder 41, whereby to complete the attachment procedure.

The operation of attachment of the rubber ribbon to the holders is as stated above. Accordingly, the dimensions of the curvable end portion, especially its dimension in the direction of its height H', need not be small. Thus, the dimensions can be set substantially freely so that sufficient rigidity of the rubber ribbon can be maintained. As such, the curvable end portion, though being a portion not held by the holder 51, is capable of performing unfailing wiping operation. Also, the provision of the projection 9 serves to enhance the rigidity of the rubber ribbon in the vertical direction, i.e. in the direction in which it presses against the surface of the mirror 2, as stated in the earlier part of this specification.

Figure 8:
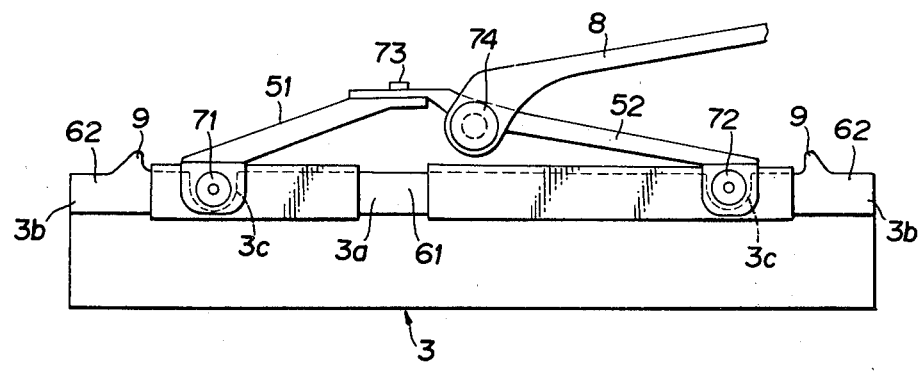
FIG. 8 is a side view of wiper means of a modification of the above-said embodiment of the present invention.

Owing to the arrangement stated above, it will be noted that, in case the rubber ribbon 3 hits the mirror holder 1 during the wiping operation, not only the curvable intermediate portion 61, but also the curvable end portion 62 of the rubber ribbon 3 are bent and they deform themselves in a manner as shown in FIG. 2. Thus, according to the wiper means of the present invention, it is possible to broaden the wiping area to a greater extent than that given by a conventional wiper means W' indicated by imaginary lines in FIG. 2, and to thereby reduce the area of the mirror surface which is left unwiped during the wiping operation. Furthermore, according to the present invention, the rubber ribbon 3 has a portion which is not supported by the holder 51. Thus, the rubber ribbon is able to freely deform itself elastically in the direction indicated by an arrow C. However, because the rubber ribbon is given a sufficiently great dimension H' at a particular portion, there is retained a sufficient rigidity of the rubber ribbon in the direction of pressing against the surface of the mirror 2. Thus, the wiping ability of the wiper means can be maintained in a sufficient degree. It should be understood also that, in the present embodiment, the end portion 3j of the rubber ribbon 3 which is located at a site remote from the curvable end portion 62 partly protrudes beyond the holder 52. Therefore, this portion also can curve, and contributes to the broadening of the wiping zone of the mirror surface. To ensure this effect, arrangement may be made so that the opposite two end portions are provided so as to be curvable end portions 62 and 62, as shown in FIG. 8. For the sake of simplicity, in FIG. 8, like parts are indicated by like references used in the embodiment described above. Also, during the period in which the wiper means is not in use, it can be placed at a position on the mirror surface in which it is shifted closely and extremely to the mirror holder 1 side, to provide a wide range of view of the mirror. Moreover, arrangement is not provided so that only the intermediate portion of the rubber ribbon can be curved. Therefore, permanent distortions of the rubber ribbon will not take place easily, and thus it is possible to maintain the wiping ability for an extended period of time.

As stated above, the mirror apparatus provided with the wiping means according to the present invention described above is such that the wiping rubber ribbon has a large curvability, so that the wipable area of the mirror surface can be broadened as compared with the conventional wiper means and that, accordingly, the wiping ability is good. Furthermore, the wiper means is able to be shifted of its position extremely closely to the mirror holder, and accordingly, during the non-use period of the wiper means, the blocking of the visual field on the mirror surface by the wiper means can be minimized. Moreover, the rubber ribbon can hold its dimension in the direction of its height at its end portions, so that the rigidity of the rubber ribbon in the direction of pressing against the mirror surface at the end portions of the rubber ribbon is not reduced, and in spite of this rigidity, the attachment of the rubber ribbon can be accomplished easily, and the operation of manufacture of the mirror assembly is enhanced. Thus, the mirror apparatus of the present invention has many desirable effects and advantages.

What is claimed is:

1. A mirror apparatus having a wiper means intended to wipe a surface of a mirror supported on a mirror holder, wherein said wiper means comprises:

a rubber ribbon for wiping the mirror surface;

a pair of holders for supporting said rubber ribbon; and a pair of stays for supporting said pair of holders, respectively, to cause them to exert wiping operations, said rubber ribbon being provided with a curvable intermediate portion and a curvable end portion which are respectively resulted from arrangement of said rubber ribbon being supported by said pair of holders excluding an intermediate portion and at least one end portion of said rubber ribbon, said pair of stays being coupled to each other by a shaft member at a site just above said intermediate portion of said rubber ribbon to provide for pivotable actions of these stays, that particular holder which is located on said curvable end portion side of said rubber ribbon being coupled to its mating stay at a site located within a groove formed at a corresponding site of said rubber ribbon.

2. A mirror apparatus having a wiper means according to claim 1, wherein said curvable end portion of said rubber ribbon has such dimension in the direction of its height as is substantially equal to or greater than such dimension in the remaining portions of the rubber ribbon.

3. A mirror apparatus having a wiper means according to claim 1, wherein said curvable end portion of said rubber ribbon has a reinforcing projection.

4. A mirror apparatus having a wiper means according to claim 2, wherein said curvable end portion of said rubber ribbon has a reinforcing projection.

* * * * *